Nov. 20, 1962   O. J. GAGNE ETAL   3,064,314
METHOD OF MAKING METAL CLAD OBJECTS
Filed Nov. 17, 1958

INVENTORS
OSCAR J. GAGNE
BERNARD J. BROWN
BY
ATTORNEYS 3,064,314
METHOD OF MAKING METAL CLAD OBJECTS
Oscar J. Gagne, Grosse Point, and Bernard J. Brown, Detroit, Mich., assignors, by mesne assignments, to August Lapple G.m.b.H. & Co., Heilbronn a.N., Germany
Filed Nov. 17, 1958, Ser. No. 774,184
1 Claim. (Cl. 18—59)

The present invention relates to a method of making metal clad objects such as a metal clad plastic die.

In accordance with the present invention an object formed of a suitable material such for example as a resin compound, has provided on all or part of a surface thereof a metal coating which is continuous, homogeneous, and which is capable of withstanding very substantial stresses such as may be encountered in metal forming. In some cases the object may be used as a part of a draw-die, a metal forming die, a gauge, metal faced patterns, fixtures, or simply as a useful article of commerce characterized in that it is completely or partially covered with a metal coating or shell. However, production dies constructed in accordance with the present invention are particularly useful and accordingly, the specific description of the method of production which follows is directed chiefly to a method of producing production dies.

Production dies composed of resin compounds have been used in the past. Such dies have the advantage that the resin may be caused to conform to a mold so that the die assumes a counterpart shape when cast or pressure cast against the mold. However, dies formed of resin compound have not been acceptable as high production dies because of their inability to withstand wear.

Efforts have been made in the past to improve the wear qualities of dies formed of resin compounds by providing a metal shell or coating at least over portions of the die subject to particular wear. These efforts have met with uniform failure because of the fact that it was impossible to form a metal shell or coating in such a way that it withstood stresses tending to cause it to chip or crack.

Applicants have found that by the practice of a novel sequence of method steps, it is possible to provide an object formed essentially of a suitable resin compound having desired surface portions thereof covered with a metal coating or shell which is firmly and permanently bonded to the resin compound and is supported by the resin compound so as to have the property of long life even when used as a high production die.

With the foregoing general remarks in mind it is an object of the present invention to provide a method of forming a continuous, homogeneous metal shell of desired configuration and permanently bonding or uniting this shell with a hard rigid backing body formed of a resin compound.

More specifically, it is an object of the present invention to provide a method of producing an object as described in the preceding paragraph in which the metal shell is formed by spray deposition.

It is a further object of the present invention to provide a method as described in the preceding paragraph in which the metal shell is deposited on a surface of a material selected to be wetted by the sprayed metal so that the sprayed metal tends to flow out evenly and to form a homogeneous mass of any desired thickness.

More specifically, it is an object of the present invention to produce a metal sheathing or shell shaped in accordance with a mold, which comprises the steps of providing on the mold a film of a material adapted to operate as a parting agent and as a wetting agent for a subsequently applied film, thereafter applying a second film of a material adapted to be wetted by the metal sheathing or shell subseqeuntly to be deposited, and finally, spraying onto the second film a deposit of metal to the required depth.

It is a further object of the present invention to provide a method as described in the preceding paragraph in which the first film is formed of a suitable resin such for example as polyvinyl alcohol.

It is a further object of the present invention to provide a method as described in the preceding two paragraphs in which the second film contains metal such for example as zinc, aluminum, tin, lead or babbitt, and preferably in which the said second film is composed entirely of one or more of the aforementioned metals.

It is a further object of the present invention to provide a metal faced plastic object by a method which comprises producing a metal sheathing or facing as suggested in the preceding paragraphs, followed by the step of providing a flowable fiber reinforced resin compound against the exposed face of the metal shell while supported on the mold, and curing the resin compound to cause it to harden.

It is a further object of the present invention to provide a method as described in the preceding paragraph which comprises the steps of enclosing the metal covered portion of the mold and applying the fiber reinforced resin compound to the exposed surface of the mold and its metal covering under substantial pressure.

It is a further object of the present invention to provide a method as described in the preceding paragraph which includes the step of applying a thin layer of a suitable sealing material such as a plastic to form a film over the pores of the sprayed metal so as to prevent penetration of the resin compound when applied against the surface of the sprayed metal under pressure.

Other objects and features of the invention will become apparent as the description proceeds, especially when taken in conjunction with the accompanying drawing, illustrating a preferred embodiment of the invention, wherein.

Figure 1:
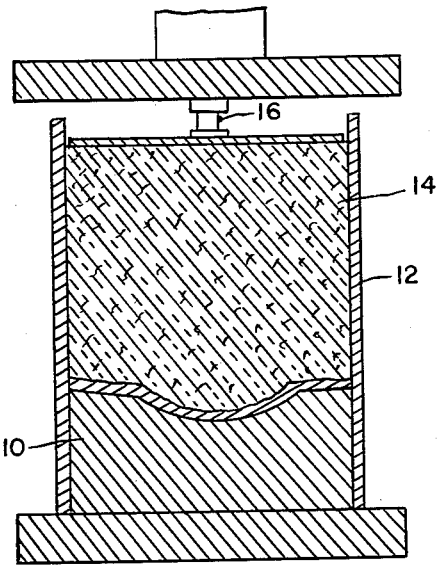
FIGURE 1 is a vertical sectional view through a mold showing the application of the resin compound thereto.

At the present time production dies are generally formed from steel or cast iron castings cast roughly to the desired contour and machined to approximate final contour by duplicating machines known as Kellering machines. The Kellering machine may bring the surface of the casting to approximate shape but it leaves the surface ridged and uneven. Thereafter, the surface is brought to final shape by manual operations known as barbering or spotting, which includes grinding the surface to the desired contour. The foregoing is a very expensive and time consuming operation.

In accordance with the present invention production dies may be produced at substantial cost savings and in a very much shorter period of time.

High heat epoxy casting resins are available which when cured are substantially hard, rigid, and wear resistant bodies and which may be cured without appreciable dimensional changes. A suitable epoxy resin for this purpose will subsequently be described in detail.

By the practice of the present invention there may be produced a die which is composed essentially of a hard, rigid, fiber reinforced epoxy resin compound, the operating surface of which is provided with a covering of a suitable metal. Metals suitable for this purpose are steel including stainless steel, and bronze.

In order to produce an object of the type referred to herein, there is first provided a mold 10 which may be formed of a suitable material such for example as hard plaster. The upper surface of the mold is shaped to a required contour as for example by placing a model to be duplicated by the die against the surface of the plaster as it sets. The model of course is provided with a suitable parting agent so that after the plaster has set, the model may be removed and leave the exposed surface of the set plaster as a counterpart of the surface thereof.

It is the ultimate aim of the present invention to provide on the plaster mold a metal shell or coating which may subsequently be transferred as the surface coating or sheath of a resin compound body. However, it has been found that if metals suitable for sheathing plastic dies are sprayed directly on the plaster mold, the metals do not spread out evenly, or "wet" the surface of the mold. Moreover, the material seems to pile up and to develop undesirable conditions which in subsequent use tend to cause it to flake or chip.

In accordance with the present invention the exposed surface of the plaster mold is first provided with a film of a material which serves jointly as a parting agent and as a wetting agent. This material may be sprayed over the surface of the plaster model so as to provide a continuous film. The precise depth of the film is not important except that it shall be of sufficient depth as to insure continuity of the film at least over portions of the surface of the mold which are subsequently to be provided with the metal sheathing.

The following step of the operation is to provide a second or intermediate coating over the primary coating. The material of the second or intermediate coating is one which is wetted by the metal sheathing material when subsequently deposited thereon by a spray gun.

The sheathing material which is ultimately to be exposed at the operating surface of the body of resin compound may be a bronze, or a steel including stainless steel. It has been found that to provide a surface which is wetted by these sheathing materials, the second or intermediate coating must contain metal. Excellent results have been obtained when the second or intermediate coating is metallic zinc or aluminum sprayed directly on the primary coating. It appears that the essential property of the intermediate coating is that it shall be composed of, or contain a substantial percentage of, one or more selected metals. These metals may be described as non-ferrous, non-inflammable, and having a lower melting point than the metal to be applied subsequently. The suitable metals are zinc, tin, aluminum, lead, babbitt, etc.

Referring again to the initial film of material which serves as a combined parting and wetting agent, the material of this film must be one which is wetted by the particular material used in applying the second or intermediate film.

The resin compound is liquid and is preferably applied to the desired area of the plaster mold by spraying. However, the application of these compounds may be by brushing or otherwise. Since it is important to produce the final metal sheathing or coating on the resin compound body so as to conform as exactly as possible to the surface of the plaster mold, it will be understood that the primary and second or intermediate coatings or films are as thin as possible and of uniform thickness.

The primary coating is allowed to cure and such cure may if necessary be accelerated or induced by heating of the plaster model as required.

Application of the second or intermediate film is also preferably by spraying. Where this film is a metallic film such as a zinc film or an aluminum film, it is most conveniently sprayed by a spray gun adapted to bring the metal to a high temperature and to spray it in substantially atomized condition onto the primary surface. Guns of this type are available on the market and are described in U. S. Patents Nos. 1,917,523; 2,227,752; 2,340,903; 2,361,420; 2,659,623; 2,381,931; 2,381,932; 2,397,165 and 2,592,607.

Following the spraying of the second or intermediate coating the final metallic shell or sheathing is sprayed onto the secondary coating by means of a spray gun of the type referred to above. Inasmuch as the intermediate coating is wetted by the metal as it is deposited on the intermediate coating by the spray gun, the material spreads evenly over the surface of the intermediate coating and builds up uniformly and homogeneously to the required thickness. The actual thickness of the metal coating may vary from a few thousandths of an inch to a substantial fraction of an inch, such for example as ½ inch or more.

It has previously been mentioned that in some cases it is unnecessary to provide a sheathing or metal shell over the entire surface of the resin compound body. In this case the metal deposit may vary in thickness from a maximum at a point on the surface subjected to maximum stress to zero, the material feathering out at the edges of the deposit to negligible thickness. The resultant metal clad object will then of course have a surface which will be in part the resin material of the compound and the remainder thereof will be metal covered.

It has been found that by the use of the two preliminary coatings, adequate wetting results in deposition of the metal in such a way that it is continuous, hard, homogeneous, and not subject to flaking or chipping when subjected to stresses in use.

The subsequent steps in the production of the metal coated articles depend upon the use to which the articles are to be put. If the object is to be employed as a production die it is essential to back up the metal shell or sheathing with a hard, rigid body capable of withstanding the stress to which the die is subjected in use and to prevent flexing or bending of the metal shell or sheathing. The most suitable material for this purpose is found to be a suitable high heat epoxy casting resin compounded with reinforcing fibrous material. Fibrous material for this purpose may be glass fibers, steel wool, or the like. The fibrous material may be loose or it may be woven into cloth or felted into a suitable fabric. In any case, sufficient of the the fluid resin is provided so that in the finished product a solid dense resin compound reinforced by the fibers is obtained. In general, it is found that two parts by weight of the resin compound to one to four parts by weight of the fibrous material is a proportion which provides a safe excess of the fluid resin compound so that the finished fiber reinforced compound will be completely dense and solid and without voids.

Figure 2:
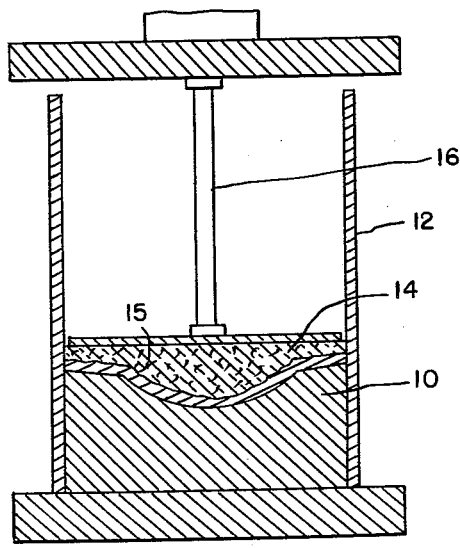
FIGURE 2 illustrates the structure with the resin compound backing finally pressed against the metal shell.

The coated plaster mold 10 is placed in a suitable form or box indicated generally at 12, and within this form or box the resin compound as indicated at 14 is placed in contact with the spray deposited metal shell 15 on the surface of the plaster form. The resin compound is mixed with a suitable hardening agent, accelerator or curing agent and sufficient pressure is applied, as for example by the mechanism indicated diagrammatically at 16, to press the compound against the exposed surface of the metal coated plaster mold 10. For example, pressures of approximately 50 pounds per square inch have been found to be suitable. Preferably, an excess of the fluid resin is provided so that the fibrous reinforcing material is greatly compressed as indicated in FIGURE 2, and is completely saturated, thereby producing a solid, dense, fiber reinforced resin compound from which some excess fluid resin will have been pressed. Normally, the accelerator or hardening agent employed operates without the application of external heat although heating may be provided if necessary or if desired to accelerate curing of the resin.

After the resin compound has cured the resin compound is removed from the box or form and the metal sheathing or shell separates from the plaster mold and remains as a permanent integrally united part of the resin compound body.

In order to prevent penetration of the resin compound into the pores of the sprayed metal, a thin layer of a suitable sealer such as a plastic is provided to form a film over the pores of the sprayed metal before application under pressure of the fluid resin compound. A suitable sealer for this purpose may be the same epoxy resin used in the backing, which may be applied in the form of a spray to the exposed surface of the spray deposited metal prior to application of the resin compound thereto. Thus, penetration of the resin compound into the pores of the sprayed metal is prevented, and these pores are permitted to operate as reservoirs for lubricants, which is desirable in some cases.

If the metal clad or coated resin compound object is not to be employed as a die, but instead is to be used as an article which is not subjected to particular stress in use, it may be satisfactory to apply the resin compound backing without particular pressure as for example by manually pressing resin saturated fibrous material against the exposed surface of the metal.

It may be mentioned that when the cured resin compound is separated from the plaster mold, the intermediate coating which may be the zinc coating referred to specifically above, remains on the surface of the metal sheathing or shell. This however, is an extremely thin coating of substantially uniform thickness and is removed in the first usage of the article, where it is used as a die. If it is not used as a die, the zinc may be removed from the surface of the steel or other metal sheathing or shell by abrasion, dissolving, or otherwise. The initial coating which was applied to the plaster and which serves the dual function of a parting agent and a wetting agent for the subsequently applied secondary or intermediate coating will in most cases have been dissipated although portions and traces of residue may remain on the plaster mold.

Although the specific requirements of the resin compound for providing a backing and support for the metal sheathing or shell will of course vary with the requirements, excellent results have been obtained when the object is to be used as a low cost high production die by employing an epoxy resin as described below:

The high heat epoxy casting resin is the reaction product of epichlorohydrin and bisphenol A carried out at temperatures between 105 and 110 degrees centigrade with an excess of sodium hydroxide. The reaction is continued to produce an epoxy resin having an approximately average molecular weight of 400. The resin is liquid, having a viscosity of 10,500–19,000 cps., and a specific gravity of 1.15–1.17. The epoxy value, equiv./100 gm. is 0.50. The hydroxyl groups per molecule are 0.14–0.28. The epoxy assay in grams per gram mole is 185–200.

A suitable hardener or curing agent for this casting epoxy resin contains 40 parts by weight of 4,4' methylenedianiline and 60 parts metaphenylene-diamine. This material is mixed with the resin, about 15–20 parts of the hardener to 100 parts of epoxy by weight.

While a specific epoxy resin has been mentioned, it is of course obvious that other resin compounds may be employed, particularly where the article is not subjected to the stresses and does not require the dimensional stability inherent in epoxy resin. Where however, the article is to be used as a die and where it is essential to produce a very close duplication of the surface conformation of the plaster mold, epoxy resin is used because it is sufficiently hard and strong and may be caused to set without undergoing significant dimensional changes.

It has been found that by the present method duplication of the surface of the plaster mold may be within .002" and moreover, the simple method as described herein produces a surface on the metal clad object of a smoothness substantially equal to the smoothness of the surface of the plaster mold.

As a variation of the foregoing it is possible to produce a die including a cast iron body having one surface conforming generally to the contour of the die, an intermediate ply of cured resin, and a facing or sheath at the outer surface of the resin formed of metal as described above. In producing a die of this type the metal sheath, coating or shell is formed on the plaster mold as previously described. The mixture of casting resin, reinforcing fibers, and hardener is then placed against the exposed surface of the metal shell and is distributed substantially uniformly thereover in sufficient quantity to produce a bonding layer of substantial thickness, as for example a small fraction of an inch to several inches. The cast iron backing member is brought into engagement with the upper surface of the resin and sufficient pressure is applied to compact the material and to squeeze excess fluid resin out of the mass of fibers.

This method has the advantage that the surface of the die is formed to the exact shape of the mold without the necessity of machining as in the previously described embodiment of the invention.

It is desired to emphasize the fact that the die as produced in accordance with the methods disclosed herein is a high production metal forming die capable of forming low carbon open hearth cold rolled steel of a thickness of as much as 3/16 inch into rather complex shapes. Steel of this type is used in automobile production as body parts.

By the provision of the metal sheath or shell to at least all portions of the die subjected to extreme wear, a die is produced capable of forming rather complex shapes including three-dimensional curvatures.

Described in general terms, the present invention is characterized in the combination of two steps. The first step is the formation of the metal shell by an operation which produces a dense homogeneous body of metal of substantial thickness, the thickness being at least .030" at areas of the die where severe wear is anticipated. The second step of the method is the provision of the solid dense rigid backing support to the metal shell. This is accomplished by a pressure casting method which substantially completely eliminates air bubbles and porosity in the resin backing. In the pressure casting, the resin and inorganic fiber reinforcing material are maintained under relatively high pressure during setting while space is provided for the escape of entrapped air from bubbles and the like. This continued application of pressure at a value sufficient to squeeze excess fluid resin out of the mass of fibers, eliminates all voids and air bubbles and insures complete density of the backing material so that it is capable of supporting the metal shell without permitting it to flex in use.

A second advantage of the pressure casting as carried out in the present method is that the metal shell is retained firmly in pressure contact with the contoured surface of the mold as the resin cures. Thus, if portions of the metal shell have during deposition become separated or spaced from the surfaces of the mold, the metal shell is caused to conform to the mold surface during solidification of the resin.

It may be mentioned that at the present time, a high production metal forming die constructed as outlined in the foregoing is in actual production in forming an efficient body part in one of the principal automobile manufacturers.

The drawing and the foregoing specification constitute a description of the improved metal clad objects in such full, clear, concise and exact terms as to enable any person skilled in the art to practice the invention, the scope of which is indicated by the appended claim.

What we claim as our invention is:

The method of making a high production die capable of forming ferrous sheet material which comprises providing a parting and wetting resin film on a female mold surface, depositing on said parting and wetting film a thin uniform coating of a metallic wetting material having a relatively low melting point, spray depositing a metallic protective shell on said coating having a relatively high melting point to substantial thickness, applying a thin layer of plastic sealer to the inner surface of the protective shell to form a film over the pores thereof, and subsequently pressure casting against the sealed inner surface of the protective shell a resin compound die body containing a relatively high proportion of inorganic reinforcing fibers.

References Cited in the file of this patent

UNITED STATES PATENTS

| | | |
|---|---|---|
| 1,935,916 | Ragsdale | Nov. 21, 1933 |
| 2,412,813 | Keller | Dec. 17, 1946 |
| 2,433,929 | Slater | Jan. 6, 1948 |
| 2,515,589 | Brauchler | July 18, 1950 |
| 2,518,890 | Heron et al. | Aug. 15, 1950 |
| 2,751,626 | Lijynen et al. | June 26, 1956 |
| 2,836,530 | Rees | May 27, 1958 |